| United States Patent [19] | [11] | 4,128,435 |
|---|---|---|
| Bäumer et al. | [45] | Dec. 5, 1978 |

[54] LUSTROUS PIGMENTS FOR PIGMENTING CASEIN PLASTICS

[75] Inventors: Wilhelm Bäumer; Horst Bernhard; Reiner Esselborn; Jörg Ohngemach; Otto Stahlecker; Fritz Zureda, all of Darmstadt, Germany

[73] Assignee: Merck Patent Gesellschaft mit beschrankter Haftung, Germany

[21] Appl. No.: 809,811

[22] Filed: Jun. 24, 1977

[30] Foreign Application Priority Data

Jun. 24, 1976 [DE] Fed. Rep. of Germany ....... 2628353

[51] Int. Cl.$^2$ .............................................. C09J 3/24
[52] U.S. Cl. ......................................... 106/148; 79/1; 106/291; 264/DIG. 38

[58] Field of Search .................... 106/148, 291, 308 B; 264/DIG. 38, 108, 148; 79/1

[56] References Cited

U.S. PATENT DOCUMENTS

| 2,332,829 | 10/1943 | Parsons et al. ........................ 264/108 |
| 3,087,827 | 4/1963 | Klenke et al. ......................... 106/291 |

*Primary Examiner*—Theodore Morris
*Attorney, Agent, or Firm*—Millen & White

[57] ABSTRACT

Pigmented substantially crack-free casein plastic compositions containing a minor, luster-imparting quantity of coated mica platelets, wherein at least 75% of the pigment particles possess an average platelet size of below 10 μm., a thickness of about 0.1 to 0.7 μm. and a ratio of diameter to thickness of about 10 to 200.

7 Claims, No Drawings

LUSTROUS PIGMENTS FOR PIGMENTING CASEIN PLASTICS

BACKGROUND OF THE INVENTION

This invention relates to lustrous coated-mica pigments especially useful for pigmenting of casein plastics and to compositions comprising same.

Casein plastics dating back to 1900 are employed for the manufacture of buttons, combs and the like, and are produced by pressing casein pasted on with water, platicizers, coloring agents and other additives. The thus obtained plastics may be hardened by treatment with formaldehyd. A detailed description of the process is given in: Kunststoff-Handbuch, Vieweg-Becker, Volume 3: Abgewandelte Kunststoffe, Hanser-Verlag, Munich 1965.

The synthetic resin mass can be colored by the incorporation of colored pigments thereon. Whereas especially interesting effects can be generally achieved in the case of coloring plastics with lustrous pigments, the lustrous pigments commercially available heretofore are not satisfactory for incorporating into casein plastics. The lead salts: lead arsenate and lead phosphate, while compatible, are extremely poisonous. Basic lead carbonate is also poisonous and, in addition, is insufficiently chemically stable. Bismuth oxy chloride and natural fish guanine are also not very suitable since both kinds of lustrous pigments are relatively instable under casein-plastic production conditions.

Because of these unsatisfactory properties of the above-mentioned lustrous pigments, a special interest arose very early in lustrous pigments based on coated mica flakes since these pigments are characterized by high stability in working up, great light fastness, vigorous gloss, high chemical stability and high temperature stability. However, attempts to incorporate these lustrous pigments into casein plastics did not give satisfactory results. The principal problem was in deleterious crack and pore formation in the case of working up of buttons and the like. All attempts to prevent this crack formation by special measures have heretofore remained unsuccessful.

SUMMARY OF THE INVENTION

An object of this invention is to provide a lustrous pigment which, besides a good gloss, possesses especial stability towards mechanical and chemical effects and against high temperatures, has high light stability and, above all, does not cause substantially any crack formation by incorporation into casein plastics.

Another object is to provide improved casein plastic compositions based on such a pigment.

Upon further study of the specification and appended claims, further objects and advantages of this invention will become apparent to those skilled in the art.

To attain these objects, there are provided lustrous pigments based on coated mica flakes in which at least 75% of the particles possess an average main diameter of less than 10 $\mu$m., and not lower than about 2 $\mu$m., a thickness between about 0.1 and 0.7 $\mu$m. and a ratio of diameter to thickness between 10 to 1 and 200 to 1. Such pigments can be incorporated into casein plastics without deleterious crack or pore formation.

Those lustrous pigments are preferred, at least 75% of which consist of particles having a diameter between 0.5 and 8 $\mu$m., with the average diameter being preferably about 3 to 7 $\mu$m.

Those lustrous pigments are also preferred, at least 75% of which consist of particles with a thickness between 0.1 and 0.5 $\mu$m.

For the production of these special lustrous pigments, mica platelets of which at least 75% possess an average diameter of below 10 $\mu$m., a thickness of 0.01 to 0.5 $\mu$m. and a ratio of diameter to thickness of 10 to 500, are coated in the usual way.

The coated mica flakes according to the invention display a vigorous lustre. This is very unexpected since the pigments according to the invention possess a diameter of only about 1 to 10 $\mu$m., whereby the average diameter has an order of magnitude of about 5 $\mu$m. It was believed, heretofore that sufficient lustre occurs only with a platelet diameter of at least 10, or even of at least 20 $\mu$m. Thus, the lustrous pigments commercially available heretofore possess, without exception, an average platelet diameter of at least 10 to 40 $\mu$m.

It could not have been expected that the coated mica flakes according to this invention, the light reflecting surface of which is smaller by at least a factor of 4 to 60 than the conventional lustrous pigments based on mica, would still exhibit an excellent lustre.

The production of the lustrous pigments according to the invention is conducted according to conventional methods, such as are described e.g. in the German Patents and Patent Applications 14 67 468; 19 59 998; 20 09 566; 22 14 545; 22 44 298; 23 13 331; 23 13 332; 25 22 572; 25 22 573; and 25 57 796, and corresponding English language patents, e.g. U.S. Pat. Nos. 3,087,828, 3,087,829, 3,711,308, 3,874,890, 3,926,659, 3,951,679, Canadian Pat. No. 964,403 and U.S. Patent Applications Ser. Nos. 754,698, 687,458, and 749,245.

The coatings of the lustrous pigments according to the invention do not differ from those of the previously known lustrous pigments, e.g. thin layers of metal oxides or metal hydroxides, e.g. $TiO_2$, $Fe_2O_3$, $SnO_2$, $Al_2O_3$, $ZrO_2$, $V_2O_5$, $Cr_2O_3$ and/or $ZnO$, as well as their hydrates. The metal oxides can be applied to the mica platelets alone or in mixtures with other possibly colored metal oxides in one layer or also in several superimposed layers. The individual layers can possibly also be colored by dyestuffs, such as e.g. Berlin Blue or aluminum color lakes. Carbon can also be used for the coating. Depending on the desired color shade, the new pigments contain at least one coating of a metal oxide or metal hydroxide layer possibly containing additionally a dyestuff on the mica flakes, the thickness of said metal oxide layers being about 20 to about 200 nm.

The mica to be used consists of at least 75% of mica platelets which possess an average diameter of below 10 $\mu$m., a thickness of 0.01 to 0.5 $\mu$m. and a ratio of diameter to thickness of 10 to 500. Mica platelets are preferably employed having an average diameter of about 5 $\mu$m. These dimensions of mica are obtained by a careful sieving or classifying of delaminated and ground mica according to standard methods.

The incorporation into the casein plastic normally takes place in such a manner that the lustrous pigment according to the invention is well mixed with an aqueous casein paste and the plastic is produced from this mass in the usual way by the application of pressure and elevated temperature. The lustrous pigments according to the invention are incorporated into the casein plastic in the usual way in amounts of 0.1 to 10%. However, as a rule, amounts of 0.5 to 3% suffice in order to impart a good lustrous effect to the objects produced from casein plastics.

From the resultant pigmented casein plastics there can then be produced, also in the usual way, buttons, combs and other articles. All articles produced with the use of the lustrous pigments according to this invention possess a surface which does not display any significant crack or pore formation, and are non-toxic and chemically stable.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

15 kg. Mica of the muscovite type, average particle size about 5 $\mu$m., mixed with desalinated water to provide a 5 to 10% suspension is brought to a pH value of 2.2 by the addition of a 25% hydrochloric acid (0.95 N) solution of titanium tetrachloride. The suspension is stirred and heated to a temperature of 70° to 75° and kept at this temperature during the entire coating process.

The 25% acidic titanium tetrachloride solution is added at a rate of 0.8 to 1 l. per hour per kilogram of mica in the suspension. The pH value is kept constant by the addition of a 35% aqueous NaOH. The coating step is terminated when 1.55 kg. titanium tetrachloride is consumed per kilogram of mica.

The pigment obtained is washed with desalinated water and calcined for 30 minutes at 950°. In transmitted light, the pigment is silvery.

In over 80% of the resultant particles, the diameter of the pigment particles is between 0.5 and 8 $\mu$m.; the thickness of the pigment particles is, in the case of over 90% of the pigment particles, between 0.1 and 0.7 $\mu$m. and the ratio of diameter to thickness is, in the case of over 85% of the particles, between 10 and 200.

EXAMPLE 2

Proceeding analogously to Example 1, with the exeception that, in order to obtain other colored pigments, the following amounts of TiCl$_4$ are consumed per kilogram of mica: T,80

The diameter of the pigment particles is, in the case of over 80% of the particles, between 0.5 and 8 $\mu$m., the thickness of the pigment particles is, in the case of over 80-85% (depending upon the color of the particles and thus the layer thickness of the deposited TiO$_2$ layer) of the particles between 0.1 and 0.7 $\mu$m. and the ratio of diameter to thickness is, in the case of over 75-80% of the particles, between 10 and 200.

Using methods described in the literature, other coated mica pigments can also be produced. Merely the amount of the coating material must be increased corresponding to the larger surface area per kg. of the finely divided mica used in this invention.

EXAMPLE 3 a) Casein (50 g.) is mixed with 12.5 g. water 150 mg. of a lustrous pigment based on mica/TiO$_2$ (60% mica, 40% TiO$_2$ as anatase) having an average diameter of about 5 $\mu$m. The mixture is compressed to a pressure of about 10,000 ats. for 0.5 minutes at 80° C and thereafter hardened in the usual way. After grinding and polishing the sample, practically no crack and pore formation can be seen by microscopic examination.

b) For purposes of comparison, a colored casein plastic is produced analogously to Example 3a which contains a lustrous pigment having a diameter of 10 to 40 $\mu$m. (72% mica, 28% TiO$_2$ as anatase). A microscopic examination of the ground and polished sample discloses clear crack and pore formation.

EXAMPLE 4

50 g. Casein are mixed with 12.5 g. water and mixed with 500 mg. of a lustrous pigment based on mica/Fe$_2$O$_3$ (43% mica, 57% Fe$_2$O$_3$) with copper-colored interference color and an average diameter of about 5 $\mu$m. The mixture is compressed for 0.5 minutes at 80° C. and at a pressure of about 10,000 ats and thereafter hardened in the usual way. After grinding and polishing, practically no crack or pore formation can be ascertained by microscopic examination.

EXAMPLE 5

Analogously to Example 3, a colored casein plastic is produced which contains a silvery lustrous pigment having an average platelet diameter of about 5 $\mu$m. (60% mica, 40% TiO$_2$ as rutile). The result corresponds to that of Example 3a.

EXAMPLE 6

Analogously to Example 4, a colored casein plastic is produced which contains a lustrous pigment having an average platelet diameter of about 5 $\mu$m. which, corresponding to the process described in published German Patent Application No. 23 13 332, is coated with 5% Berlin Blue. Here, again, no pore formation is found.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A pigmented casein plastic molding composition for molding by compression and heating into articles of manufacture substantially free from cracks and pores visible at 1 : 100 magnification, wherein the pigment is a minor luster-imparting quantity of lustrous pigments of coated mica platelets, wherein at least 75% of the pigment particles possess an average main diameter of below 10 $\mu$m. and not lower than about 2$\mu$m., a thickness of about 0.1 to 0.7$\mu$m. and a ratio of diameter to thickness of about 10 to 1 to 200 to 1.

2. A composition according to claim 1, wherein at least 75% of the pigment particles possess a diameter between 0.5 and 8$\mu$m.

3. A composition according to claim 1, wherein at least 75% of the pigment particles possess a thickness between 0.1 and 0.7 $\mu$m.

4. A composition according to claim 2, wherein at least 75% of the pigment particles possess a thickness between 0.1 and 0.7 $\mu$m.

5. A pigmented casein plastic composition according to claim 1 wherein the coated mica platelets have a diameter of about 1 to 10 microns and an average diameter in the range of about 3 to 7 microns.

6. An article of manufacture substantially free of cracks and pores produced by compressing and heating the composition of claim 1.

7. A method of preventing crack formation in the production of casein plastic compositions pigmented with coated mica flakes which comprises imbedding into an aqueous casein paste a minor luster-imparting quantity of coated mica platelets with a diameter of about 1 to 10 microns and average diameter of about 3 to 7 microns, and compressing and heating the resultant mass.

* * * * *